US008271418B2

(12) United States Patent
Allen et al.

(10) Patent No.: US 8,271,418 B2
(45) Date of Patent: Sep. 18, 2012

(54) CHECKING RULE AND POLICY REPRESENTATION

(75) Inventors: Paul L. Allen, Redmond, WA (US); Michael W. Anderson, Bellevue, WA (US); David J. Finton, Issaquah, WA (US); Charles T. Kitzmiller, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 673 days.

(21) Appl. No.: 12/428,294

(22) Filed: Apr. 22, 2009

(65) Prior Publication Data

US 2009/0281977 A1 Nov. 12, 2009

Related U.S. Application Data

(63) Continuation-in-part of application No. 12/262,039, filed on Oct. 30, 2008, which is a continuation-in-part of application No. 11/209,985, filed on Aug. 23, 2005, now Pat. No. 7,921,452, and a continuation-in-part of application No. 11/209,987, filed on Aug. 23, 2005, now Pat. No. 8,056,114.

(51) Int. Cl.
*G06F 17/00* (2006.01)
*G06N 5/02* (2006.01)

(52) U.S. Cl. ......................................................... 706/47
(58) Field of Classification Search ........................ None
See application file for complete search history.

(56) References Cited

U.S. PATENT DOCUMENTS

| 2,958,179 | A | 11/1960 | Wolfe et al. |
| 6,023,765 | A | 2/2000 | Kuhn |
| 6,324,647 | B1 | 11/2001 | Bowman-Amuah |
| 6,466,932 | B1 * | 10/2002 | Dennis et al. .................... 710/33 |
| 6,640,307 | B2 | 10/2003 | Viets et al. |
| 6,968,291 | B1 * | 11/2005 | Desai ............................. 702/182 |
| 7,155,720 | B2 * | 12/2006 | Casati et al. .................. 718/104 |

(Continued)

FOREIGN PATENT DOCUMENTS

WO        WO 01/33349 A2      5/2001

(Continued)

OTHER PUBLICATIONS

Adda et al., MceTech, Jan. 19, 2005.

(Continued)

*Primary Examiner* — Omar Fernandez Rivas
*Assistant Examiner* — Luis Sitiriche
(74) *Attorney, Agent, or Firm* — Harness, Dickey & Pierce, P.L.C.

(57) ABSTRACT

A computer-performed method of examining policies for a target system of an enterprise system domain. The policies are represented as policy rules, each rule including a condition having binary operator expression(s), each expression referring to one or more policy attributes. For a pair of expressions, the computer(s) obtain sets of sample values sufficient to represent all values assumable by the policy attribute(s) referred to in the pair. The sample values are combined in a mixed-radix enumeration in which each attribute is represented in a corresponding position of each sample value combination and of the enumeration. Using the enumeration, the computer(s) evaluate each expression of the pair relative to each of the sample value combinations to obtain a truth table. Based on the truth table, a relationship between the pair is detected and the user may be notified as to an anomaly in the rules.

20 Claims, 11 Drawing Sheets

U.S. PATENT DOCUMENTS

| | | | |
|---|---|---|---|
| 7,340,469 B1 | 3/2008 | Alghathbar et al. | 707/10 |
| 7,493,300 B2 * | 2/2009 | Palmer et al. | 706/56 |
| 7,610,265 B2 * | 10/2009 | Zurek | 1/1 |
| 2002/0002577 A1 | 1/2002 | Garg et al. | 709/104 |
| 2004/0093518 A1 | 5/2004 | Feng et al. | |
| 2004/0193909 A1 | 9/2004 | Chang et al. | |
| 2005/0125555 A1 * | 6/2005 | Patel | 709/238 |
| 2005/0138039 A1 * | 6/2005 | Hagen | 707/100 |
| 2005/0166260 A1 | 7/2005 | Betts et al. | |
| 2006/0090131 A1 | 4/2006 | Kumagai | |

FOREIGN PATENT DOCUMENTS

| | | |
|---|---|---|
| WO | WO 02/101975 A1 | 12/2002 |
| WO | WO 2005/009003 A1 | 1/2005 |

OTHER PUBLICATIONS

Hannover et al., Rule-based Policy Specification: State of the Art and Future Work, 2004.
Damianou et al., A Survey of Policy Specification Approaches, Apr. 2002.
XACML, Aug. 23, 2005.
Hassan, Process based governance using Policies.
Unified Modeling Language, Aug. 23, 2005.
Ray et al., Using UML to Visualize Role-Based Access Control Constraints, 2004.
IBM Rational Software Modeler, Oct. 2004.
Ferraiolo et al., Role Based Access Control, Aug. 23, 2005.
White Papers and Business Guides, Aug. 23, 2005.
Acevedo et al., Enterprise Security Applications of Partition Rule Based Access Control (PRBAC), Aug. 23, 2005.
Manish Verma, XML Security: Control information access with XACML, Aug. 23, 2005.
Johnson, M. et al., KAoS Semantic Policy and Domain Services: An Application of DAML to Web Services-Based Grid Architectures; Proceedings of the AAMAS 03 Workshop on Web Services and Agent-Based Engineering; Melbourne, Australia; 2003.
Suri, N., et al., DAML-based Policy Enforcement for Semantic Data Transformation and Filtering in Multi-agent Systems; Proceedings of the Autonomous Agents and Multi-Agent Systems Conference (AAMAS 2003); Melbourne, Australia; New York, NY: ACM Press; 2003.
Tonti, G., et al., Semantic Web Languages for Policy Representation and Reasoning: A Comparison of KAoS, Rei, and Ponder; Submitted to the International Semantic Web Conference (ISWC 03); Sanibel Island, Florida; 2003.
Uszok, A., et al., KAoS Policy and Domain Services: Toward a Description-Logic Approach to Policy Representation, Deconfliction, and Enforcement; Proceedings of Policy 2003; Como, Italy, in press; 2003.
Uszok, A., et al., DAML Reality Check: A Case Study of KAoS Domain and Policy Services; Submitted to the International Semantic Web Conference (ISWC 03); Sanibel Island, Florida; 2003.
Article on Mixed Radix; http://en.wikipedia.org/wiki/Mixed_radix; Feb. 10, 2009.
Vainstein, F., et al., Reduction in Space Complexity and Error Detection/Correction of a Fuzzy Controller; 2006.
Richardson, A., et al.; Variable-Radix Integrated Counter; Electronic Letters, Dec. 1966, vol. 2, Issue No. 12; pp. 448-449.

* cited by examiner

CHECKING RULE AND POLICY REPRESENTATION

CROSS-REFERENCE TO RELATED APPLICATIONS

This application is a continuation-in-part of U.S. patent application Ser. No. 12/262,039 filed on Oct. 30, 2008, which is a continuation-in-part of U.S. patent application Ser. Nos. 11/209,985 and 11/209,987, both filed Aug. 23, 2005. The disclosures of the above applications are incorporated herein by reference.

FIELD

The present disclosure relates generally to representing policies applicable to enterprise systems and more particularly (but not exclusively) to checking policies and rules for errors and/or inconsistency.

BACKGROUND

The statements in this section merely provide background information related to the present disclosure and may not constitute prior art.

Modern computing systems, and the information and data within them, are governed by administrative, business, and other policies. For example, information assurance policies govern how information is protected, shared, and its availability assured. Other types of policies include quality of service (QoS) policies, which govern how computing resources are allocated for use, and network management policies, which govern how computing networks are deployed and administered. Policies governing a system or system-of-systems can differ as to policy specification and application within target computing systems. It is common to use separate authoring systems for different policy types.

SUMMARY

In one implementation, the present disclosure is directed to a method of examining policies for a domain of an enterprise system. The method is performed by one or more computers of the enterprise system. In response to user input, the policies are represented as a plurality of policy rules for use in a target system of the domain, each of the policy rules including a condition having one or more expressions, each expression referring to one or more policy attributes. For a pair of expressions of at least one of the conditions, the computer(s) obtain one or more sets of sample values sufficient to represent all values assumable by the policy attribute(s) referred to in the pair. The sample values are combined in a mixed-radix enumeration in which each attribute is represented in a corresponding position of each sample value combination and of the enumeration. Using the enumeration, the computer(s) evaluate each expression of the pair relative to each of the sample value combinations to obtain a truth table. Based on the truth table, a relationship between the pair is detected. Based on the detecting, the user is notified as to an anomaly in the rules for the target system.

In another implementation, the disclosure is directed to a system for examining policies for a domain of an enterprise system. One or more processors and memory of the enterprise system are configured to, in response to user input, represent the policies as a plurality of policy rules specific to a target system of the domain. Each of the policy rules includes a condition having one or more binary operator expressions, each expression referring to one or more policy attributes. The processor(s) check one or more of the policy rules. Based on a result of the checking, the user is notified as to an anomaly in the rules for the target system. The processor(s) and memory are further configured to, for each policy attribute in the policy rule(s) being checked, configure a set of sample values assumable by the policy attribute and sufficient to represent substantially all possible agreements and/or disagreements between two expressions being compared that refer to the policy attribute. For a policy rule being checked, each expression in the rule is compared with each combination of the sample values for the attributes referred to by the expressions, in an order determined by a mixed-radix enumeration of the sample values. Based on a result of the comparing, a relationship is detected between truth tables for the rule(s) being checked.

In yet another implementation, the disclosure is directed to a system for examining policies for a domain of an enterprise system. In response to user input, one or more processors and memory of the enterprise system represent the policies as a plurality of policy rules specific to a target system of the domain. Each of the policy rules includes a condition having one or more binary operator expressions, each expression referring to one or more policy attributes. The conditions of each pair of the policy rules are checked relative to one or more sets of sample values assumable by the policy attribute(s) referred to in the expressions of the conditions of the pair. Based on a result of the checking, the user is notified as to an anomaly in the rules for the target system. For each pair of expressions of one of the conditions being checked, the processor(s) configure each combination of the sample values for attributes referred to in the pair of expressions in a mixed-radix enumeration in which each attribute is represented in a corresponding position of the enumeration. Using the enumeration, the processor(s) evaluate each expression of the pair of expressions relative to each of the combinations and compare the expression evaluations to one another. Based on a result of the comparing, a relationship is detected between truth tables for the pair of rules being checked.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
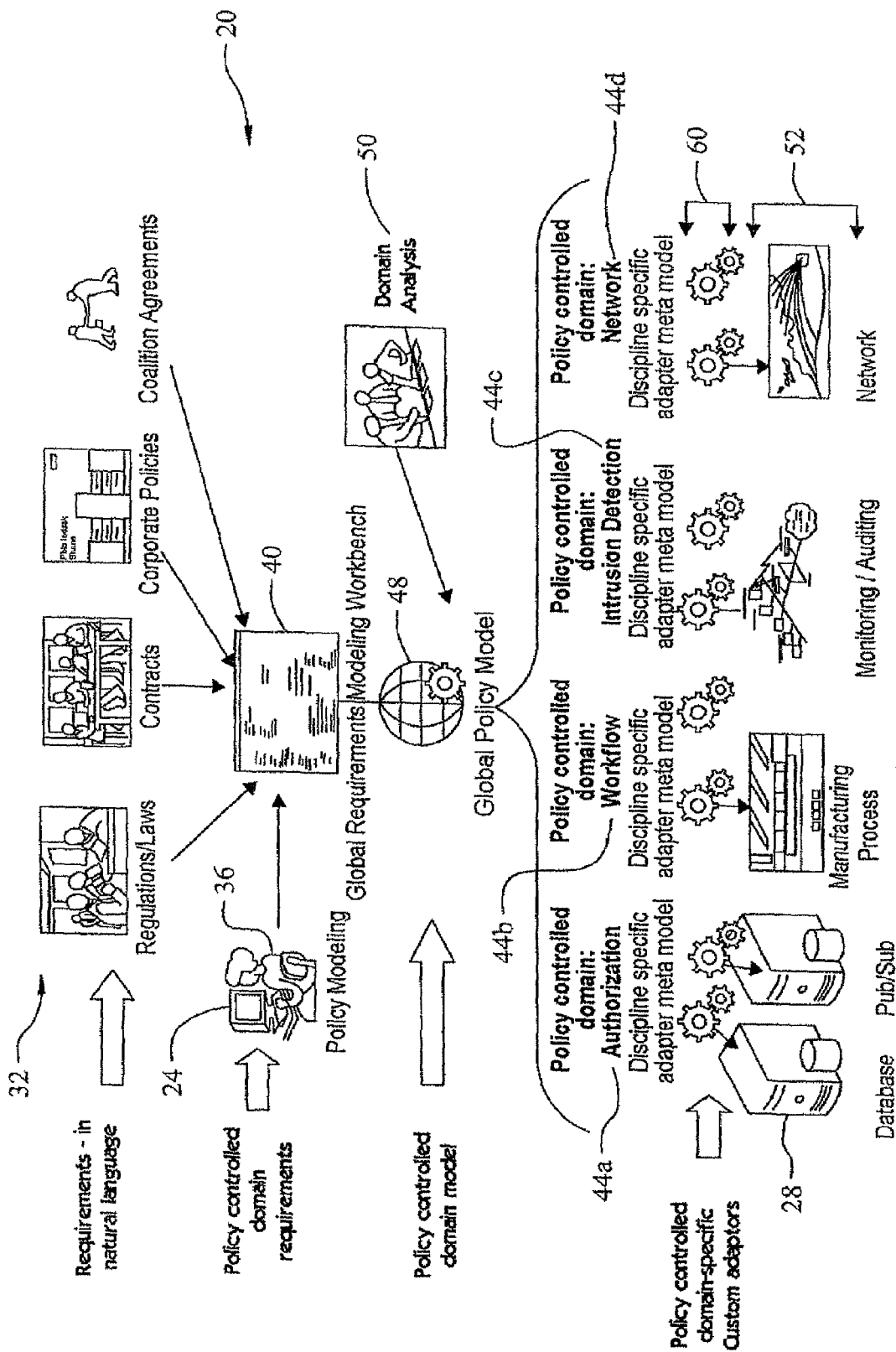
FIG. 1 is a conceptual diagram of an apparatus for implementing a global policy framework in accordance with one implementation of the disclosure.

The following description is merely exemplary in nature and is not intended to limit the present disclosure, application, or uses. It should be understood that throughout the drawings, corresponding reference numerals indicate like or corresponding parts and features.

The term "global" may be used in the disclosure and claims to refer to an apparatus, framework and/or model that can be implemented in connection with substantially any type of computing policy, including but not limited to information assurance policies, network management policies, quality of service policies, etc. Policies can be authored, analyzed for consistency and errors, and automatically adapted to substantially any type-specific implementation protocol, including but not limited to XACML (eXtensible Access Control Markup Language). Many different security components and/or sub-systems that make up a security infrastructure can be controlled by policies defined in a common interface and tool.

In various implementations of the disclosure, a global policy framework and apparatus provide an environment in which a user or group of users may author a set of consistent enterprise policies addressing, e.g., administrative, business, and/or regulatory requirements. The user(s) may adapt such policies to each protocol and application needed by systems, applications and networks used by an enterprise. Such policies and/or rules can also be linked back to the requirements.

A conceptual diagram of one implementation of an apparatus for implementing a global policy framework is indicated generally in FIG. 1 by reference number 20. The apparatus 20 includes a plurality of computers, processors and memory, etc. used, e.g., in a business enterprise system or system-of-systems (SoS). An exemplary computer 24 and servers 28 are shown in FIG. 1. It is highly probable, however, that additional computers, servers, memories, user interfaces, processors, etc. would be included in the apparatus 20 and distributed in the enterprise system.

The apparatus 20 and global policy framework are based on and include modifications to methods and apparatus described in co-pending U.S. patent application Ser. No. 11/209,985 entitled "Defining Consistent Access Control Policies" and U.S. patent application Ser. No. 11/209,987 entitled "Implementing Access Control Policies Across Dissimilar Access Control Platforms", filed Aug. 23, 2005, the disclosures of which are incorporated herein by reference in their entirety. The apparatus 20 may be used to implement requirements applicable to one or more systems of the enterprise. The requirements are modeled as contents of policies applicable to one or more target domains of the enterprise. The policy contents are integrated into a policy model. The policy model is adapted to obtain one or more representations of domain-specific requirements corresponding to one or more target systems in one or more of the target domain(s).

The representation(s) are integrated with the corresponding target systems to implement the domain-specific requirements.

Referring again to FIG. 1, policy definition is begun by defining requirements indicated generally by reference number 32. Such requirements, typically in natural language, may be derived from one or more information repositories at the human level. In a large enterprise, e.g., a system-of-systems (SoS), a variety of sets of requirements are typically documented in information repositories. Requirements 32 could include policies in areas including but not limited to regulations and/or laws, business contracts, company policies, and coalition agreements.

One or more users 36, e.g., policy administrator(s) using a modeling workbench 40, capture the requirements 32 and develop policy-related components, e.g., attributes and actions, applicable to one or more target domains indicated collectively as 44, e.g., an authorization domain 44a, a workflow domain 44b, an intrusion detection domain 44c, and a network domain 44d. The policy-related components for the domain(s) 44 are integrated into a global policy model 48.

The model 48 may be subjected to analysis 50 for target domains. Analysis of a policy applicable in one target domain 44 may lead to the analyst defining a complementary policy in another domain. For example, where a policy in the authorization domain 44a prescribes that only certain individuals with certain roles may access a certain set of information, then the authorization can be associated with a complementary policy in the intrusion detection domain 44c that informs an intrusion detection target system to monitor accesses by other roles on that same information set. Thus unauthorized access can be prevented and attempts to do so also can be identified and monitored.

The policy model 48 can be implemented to deploy policies to target systems 52 in the target domain(s) 44. In the authorization domain 44a a target system 52 may be, for example, a database and/or a network having a service-oriented architecture (SOA). In the workflow domain 44b, a target system 52 may implement workflow instructions for a manufacturing process. In an intrusion detection domain, a target system 52 may be one that monitors and logs access events in a network or other system. In a network domain, a target system 52 may be one that manages network quality of service (QoS). As further described below, various adapters 60 may be used to adapt policies described in the policy model 48 to obtain various representations of policy suitable for deployment to various target systems 52.

Figure 2A:
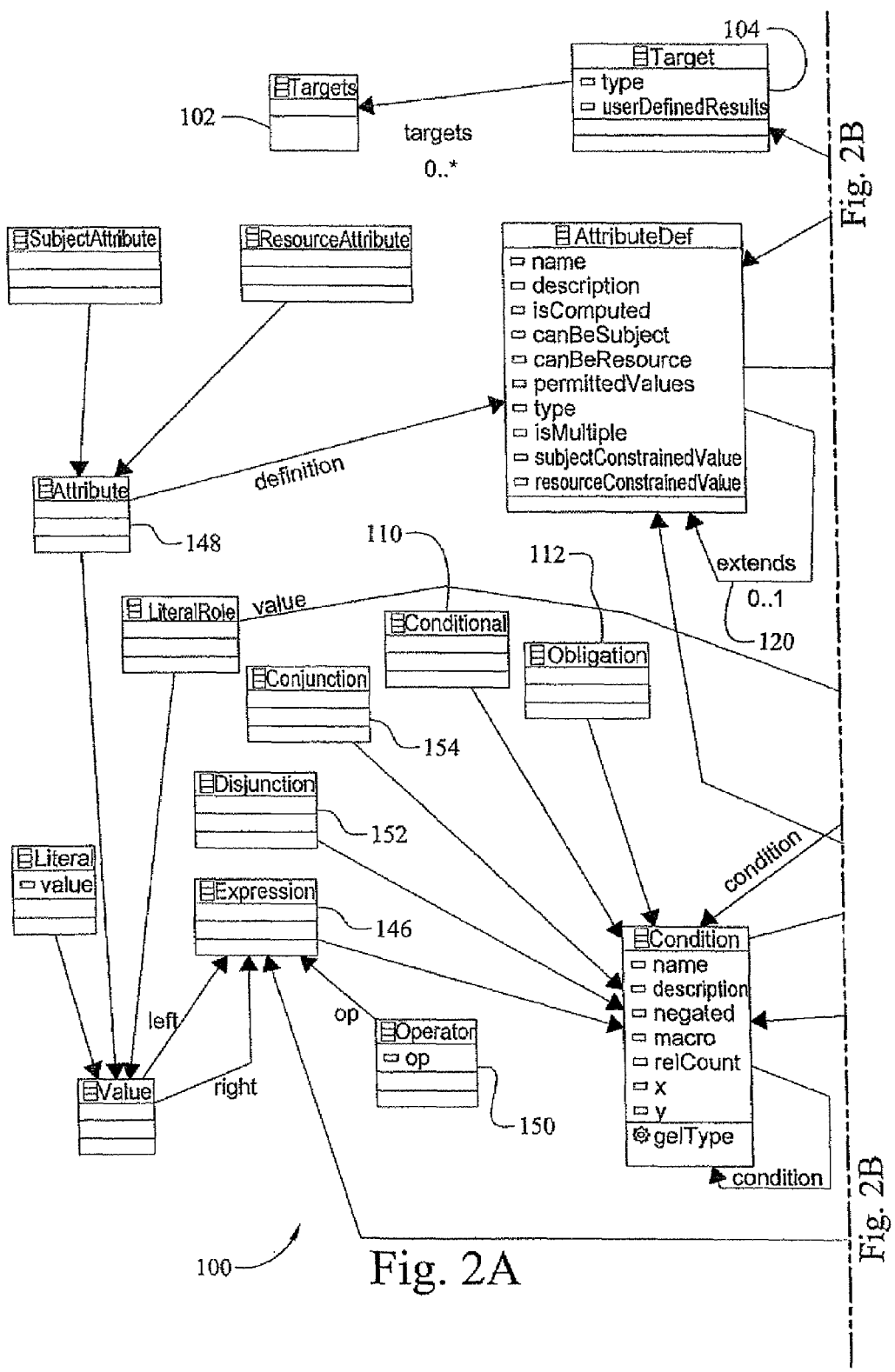
FIG. 2 is a diagram of a workbench domain requirements model in accordance with one implementation of the disclosure.
Figure 2B:
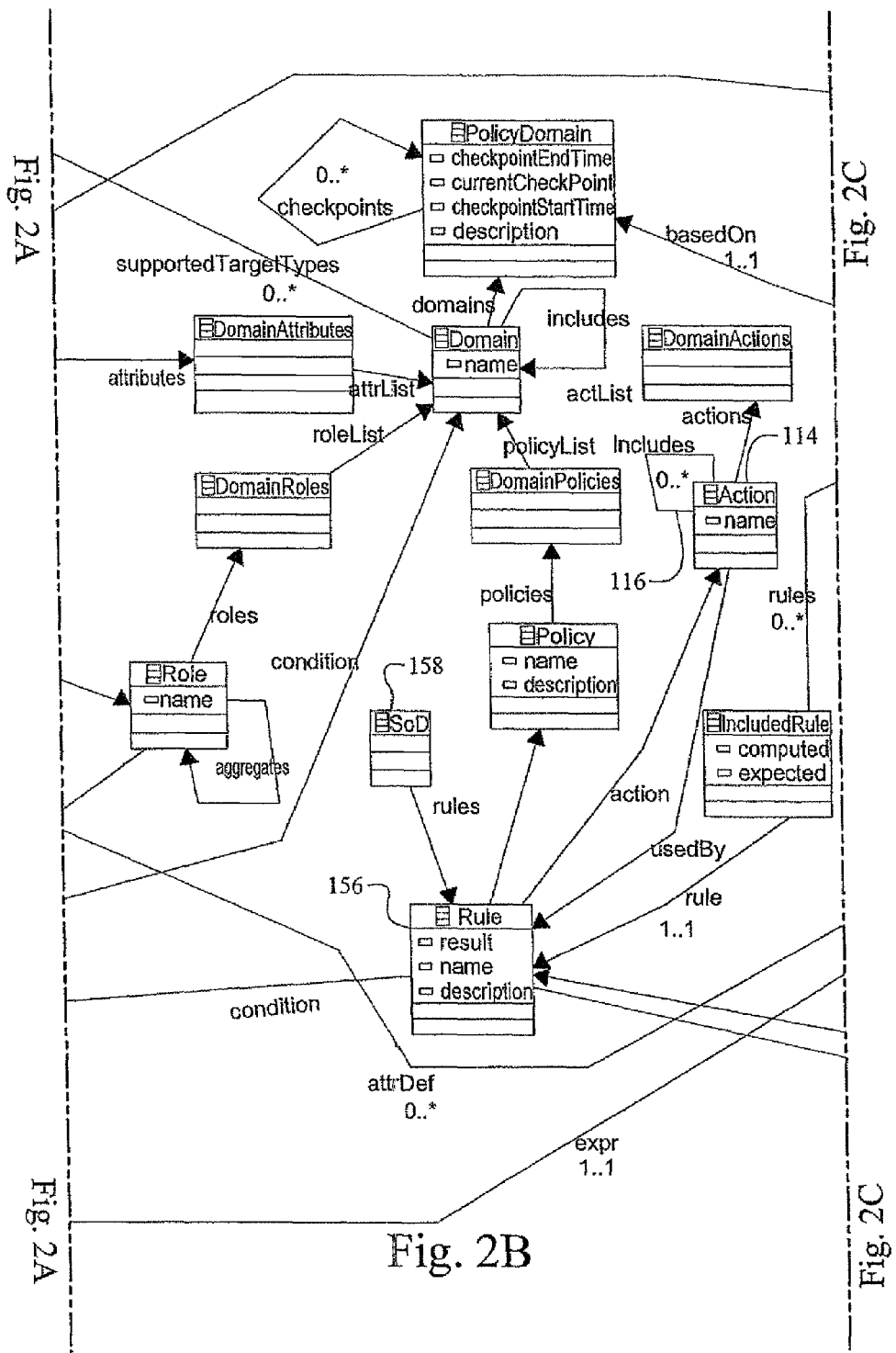
Figure 2C:
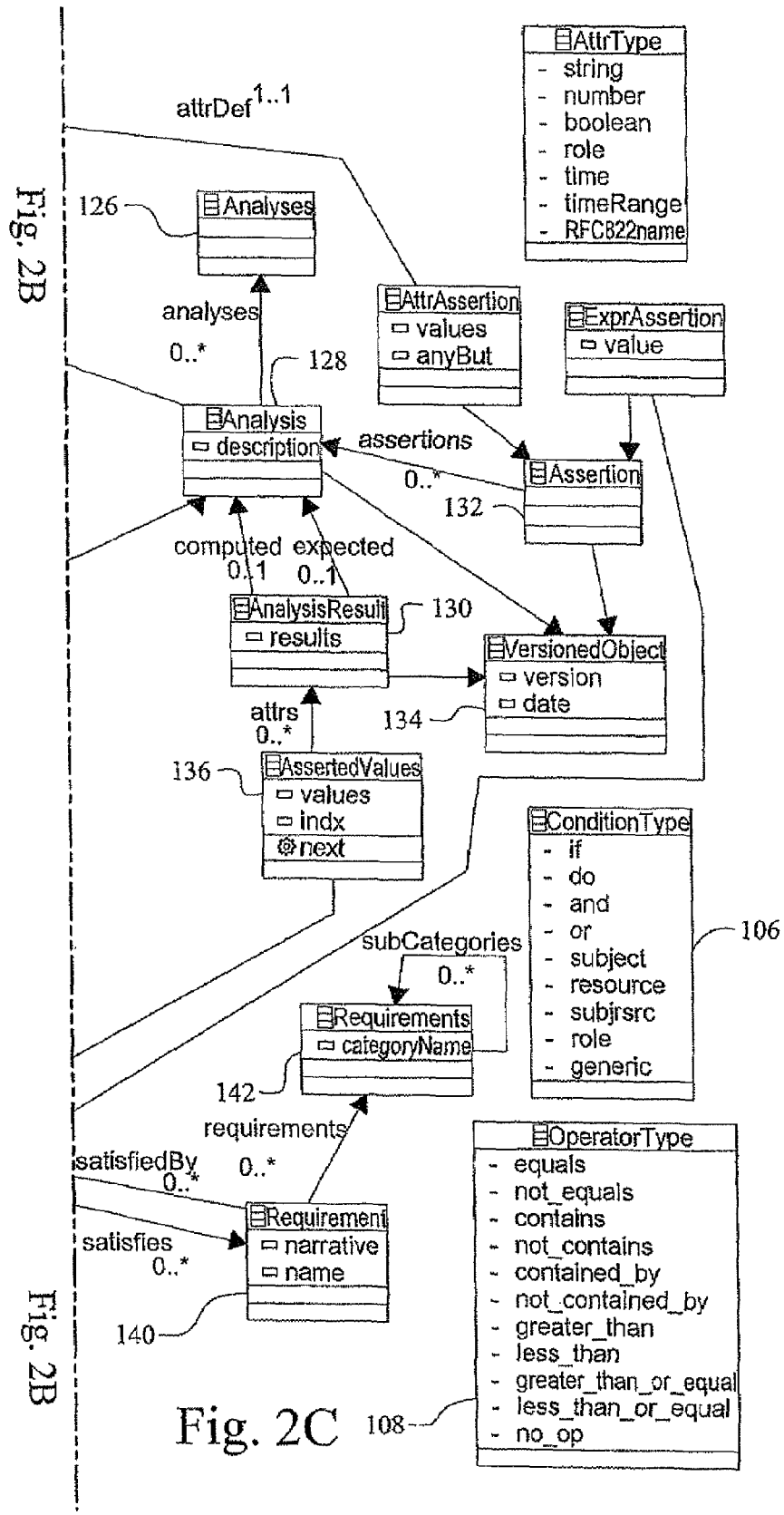

In some implementations, a Unified Modeling Language (UML) profile, i.e., a set of UML stereotypes, is defined to support modeling of the requirements 32. One example of a workbench domain model is indicated generally in FIG. 2 by reference number 100. The model 100 may be used to express policy requirements for one or more target domains 44. Targets and Target classes 102 and 104 represent information about target systems that are associated with a domain 44. A number of classes are provided in the model 100 to allow modeling of a plurality of types of requirements applicable in a domain 44. For example, Condition and Operator Types 106 and 108 and Conditional and Obligation classes 110 and 112 facilitate definition of, e.g., intrusion detection and quality of service policies. Actions 114 may aggregate other actions via an includes relation 116 so that an Action hierarchy may be constructed. An Action may include zero to many Actions, and included Actions may be an Action which itself includes other Actions. For example, a CRUD_actions Action could be defined to include individual create, read, update, and delete Actions. A document_management_actions Action could be defined to include the CRUD Action and other actions relevant to document management (e.g., copy, move).

Attributes may inherit values of another Attribute of the same type via an extends relation 120. For example, a color-palette Attribute could extend a multi-valued RGB-colors Attribute of type string, enabling it to add the values of the RGB-colors Attribute (i.e., red, green, and blue) to any "locally defined" values (e.g., cyan, magenta, and yellow). The resulting color-palette Attribute would be red, green, blue, cyan, magenta, and yellow. An Attribute automatically inherits any changes to any Attribute that it extends.

Rule results can be custom-defined, e.g., for the intrusion detection target domain 44c, instead of being restricted to either deny or permit. The model 100 also provides the ability to model obligations, that is, actions that must be performed by a target system when a rule "fires". Arithmetic expressions may also be provided in the workbench 40 to support quality of service (QoS) targets and various other targets.

A What-If Analysis framework is included in the workbench 40 to support what-if analyses. The What-If Analysis framework provides support for multiple What-if Analyses (via a versioning mechanism) and the persistence of analytical results for later recall, reporting, and comparison. The What-if Analysis framework includes a top-level object Analyses class 126 to collect analyses and an object Analysis class 128 to aggregate analysis-related information for an analysis. The Analysis class 128 aggregates object classes to persist the results of an analysis (AnalysisResults class 130) and the value(s) of each Attribute asserted by the user during an analysis (subclasses of an Assertion class 132). The AnalysisResults, Analysis, and Assertion classes are all subclasses of a VersionedObject class 134 enabling versioned instances of these classes to be created. An AssertedValues class 136 provides a means to quickly access each of the asserted values associated with an Analysis to improve performance of What-if Analysis.

A requirements traceability framework is included in the workbench 40. This framework enables end-users to document high-level textual requirements associated with a policy problem or domain and to associate requirements with policies modeled in the workbench 40. The requirements traceability framework provides a Requirement class 140 to document a requirement and a Requirements class 142 to assist in grouping, allocating, and managing sets of requirements.

What-if Analysis may be performed, e.g., to help an analyst to debug a policy model and to understand how changes to a policy model, e.g., changes to an Allow or Deny decision, affect authorization decisions. What-if Analysis can assist an analyst in determining the sensitivity of an authorization decision to changes in the model, and in determining why a set of Rules produces the decision that it does. What-If Analysis can help an analyst to identify critical modeling assumptions and important decision criteria. Alternative Rule sets can be compared, possibly leading to simplification or consolidation of Rules. Requirements can be established for validation and testing. What-If Analysis can also help an analyst to improve the robustness of a set of Policies or Rules.

What-if Analysis supports two major use cases. AssertValue is a use case in which an analyst asserts the value of one or more Attributes, Expressions, Rules or Domains to assess how the element values affect the decision computed for a set of Rules (an arbitrary set of Rules, or an entire multi-domain policy model). Select-or-Exclude Element is a use case in which an analyst selects one or more Expressions, Rules, or Domain models to include, or exclude, in the evaluation of a multi-Domain model, multi-Policy model, or multi-Rule authorization model.

What-if Analysis can assist an analyst in determining how the decision of a set of Rules is affected by: (a) including or excluding a Rule in the evaluation of a set of Policies or Rules; (b) including or excluding an Expression in the evaluation of a set of Policies or Rules; (c) setting the result of an Expression or a disjunction/conjunction of Expressions to TRUE or FALSE; (d) setting the Result of a Rule to TRUE or FALSE; (e) setting the value(s) of an Attribute or set of Attributes to a value or values; and/or (f) setting the decision of a domain to TRUE/FALSE or Allow/Deny to aid in the evaluation of combined Domains.

Policy authors may introduce errors and inconsistencies in policies, with the result that target systems using the policies might not correctly control access to information and capabilities. In a system with many complex policies it can be extremely difficult to identify and correct all such errors. A Checker capability may be used to test policy rules to determine whether they are well-formed and free of anomalies. The Checker can alert an administrator to errors, inconsistencies, and anomalies in a current policy model by creating a list of problem markers. Each problem marker indicates the problem type and its location, and allows the administrator to navigate to the rule containing the problem by a single click. The Checker can run continuously during policy creation, so that errors may be immediately detected and corrected.

The Checker may test the elements of each Rule to make sure that they are populated with values that satisfy Rule syntax. In addition, the Checker may examine Expressions 146 for mismatches between Attributes 148 and between Attributes and Operators 150. The Checker may detect pairs of Expressions 146 that are redundant, as well as combinations of Expressions that render a Disjunction 152 or Conjunction 154 trivially True or False—for example, "AND (Country equals USA, Country does not equal USA)".

The Checker may compare pairs of Rules 156 in order to find semantic problems such as redundant Rules, conflicting Rules, and Rules that violate a Separation-of-Duties 158 constraint. The Checker also may detect Rules 156 that generalize other Rules, and Rules 156 with exactly-opposite conditional logic. The Checker may expand sets of literal elements and hierarchical Role Attributes. The Checker also may accommodate Obligations, user-defined Results, arithmetic expressions, aggregated Actions, and inherited Attribute values. The Checker then converts the logic of each Rule into Disjunctive Normal Form (DNF), as a two-level tree of Expressions (an OR of ANDs).

The Checker compares Disjunctions, Conjunctions, and whole Rules by first expressing them in its internal DNF representation, and then comparing the truth-tables for these logical formulas. Truth-table comparison amounts to testing whether a pair of logical formulas agree or disagree at every possible combination of input values. As the number of inputs increases, the number of cases to consider grows exponentially. For small numbers of inputs (less than 8), Karnaugh mapping can be used to minimize these Boolean functions. For larger problems, the Quine-McCluskey algorithm provides a more efficient method of doing substantially the same thing. One technique is to iterate through the possible input configurations and maintain a set of flags that record such facts as whether either Boolean formula produced the value True, and whether the first formula was ever True while the second one was False. This strategy is similar to the action of the Unix command "cmp." The cmp command very quickly compares two files and simply tells whether they differ. Since this analysis only needs to perform an element-by-element comparison for equality, it can be very fast, even for comparatively large files.

To iterate through a set of input configurations, the Checker may treat each combination of Attribute values as a variable-base number: each Attribute corresponds to a particular digit in the number, where the values of a particular digit are the permitted values for that Attribute. One can easily "count through" these numbers by continually "incrementing" the right-most "digit," and treating an addition to the "biggest" value as a reset of that digit, with a "carry" into the digit to the left. Each of these variable-base numbers describes a unique configuration of Attribute values.

In order to "count-through" Attribute combinations, the Checker uses a set of permitted values for each Attribute. Most Attributes are defined with an explicit set of permitted values, but some may be left undefined. To include these Attributes in a truth-table analysis, one can create for them sets of permitted values that contain all values named in the Rules, as well as sufficient other values to guarantee that one can detect any differences between the truth-tables. The Checker thus may detect anomalies between pairs of Rules, as well as perform "what-if" analysis. The difference between the two applications is that in "what-if" analysis, a user may try out hypothetical changes to the permitted values, and the results can be examined by the Checker to show how the policy results depend on the Attributes and Rules.

As previously mentioned, the global policy model 48 can be implemented to deploy policies to target systems 52 in the target domain(s) 44. More specifically, a domain-specific policy set can be generated from the policy model 48, e.g., in a Universal Authorization Language (UAL) as described in U.S. patent application Ser. Nos. 11/209,985 and 11/209,987 and as may be modified in accordance with the present disclosure. It should be noted that other languages could additionally or alternatively be used to generate a policy set. Domain-specific adapters 60, which may or may not be plug-in, are used to adapt policy sets into formats useful in policy target systems 52. In various implementations, adapters 60 include discipline-specific adapter meta-models.

In various configurations the workbench 40 includes a built-in adapter 60 for publishing policy sets such as authorization policies in XACML (eXtensible Access Control Markup Language). In one implementation, XACML-formatted policies may be published to a SUN Open Source Policy Engine. In another implementation, XACML-formatted policies may be published to a COTS product such as Enterprise Policy Manager (EPM) from Cisco Systems, Inc. XML formats could also be used for policy publication, e.g., in an intrusion detection domain. Additional or alternative adapters are described in U.S. patent application Ser. No. 11/209,987.

It will be appreciated by those knowledgeable in the art that policies may vary in form dependent on a target domain and/or target system in relation to which the policies are to be implemented. For example, intrusion detection involves the placing of sensors throughout an infrastructure that monitor a network and may capture large quantities of data which can then be analyzed and visualized for anomalous or hostile behavior. Policies relevant to intrusion detection and visualization are likely to invoke monitoring activities and then state what to do if something is detected. Thus, notionally, the form of such policies may be "IF something, Then DO something". This form is different from that, e.g., of a typical authorization domain policy, which may define "who can access what". The apparatus 20 can be used to integrate policies from different domains into the same policy model. Further, in various implementations, the apparatus 20 can be used to implement policies in different domains in the same environment.

Figure 3:
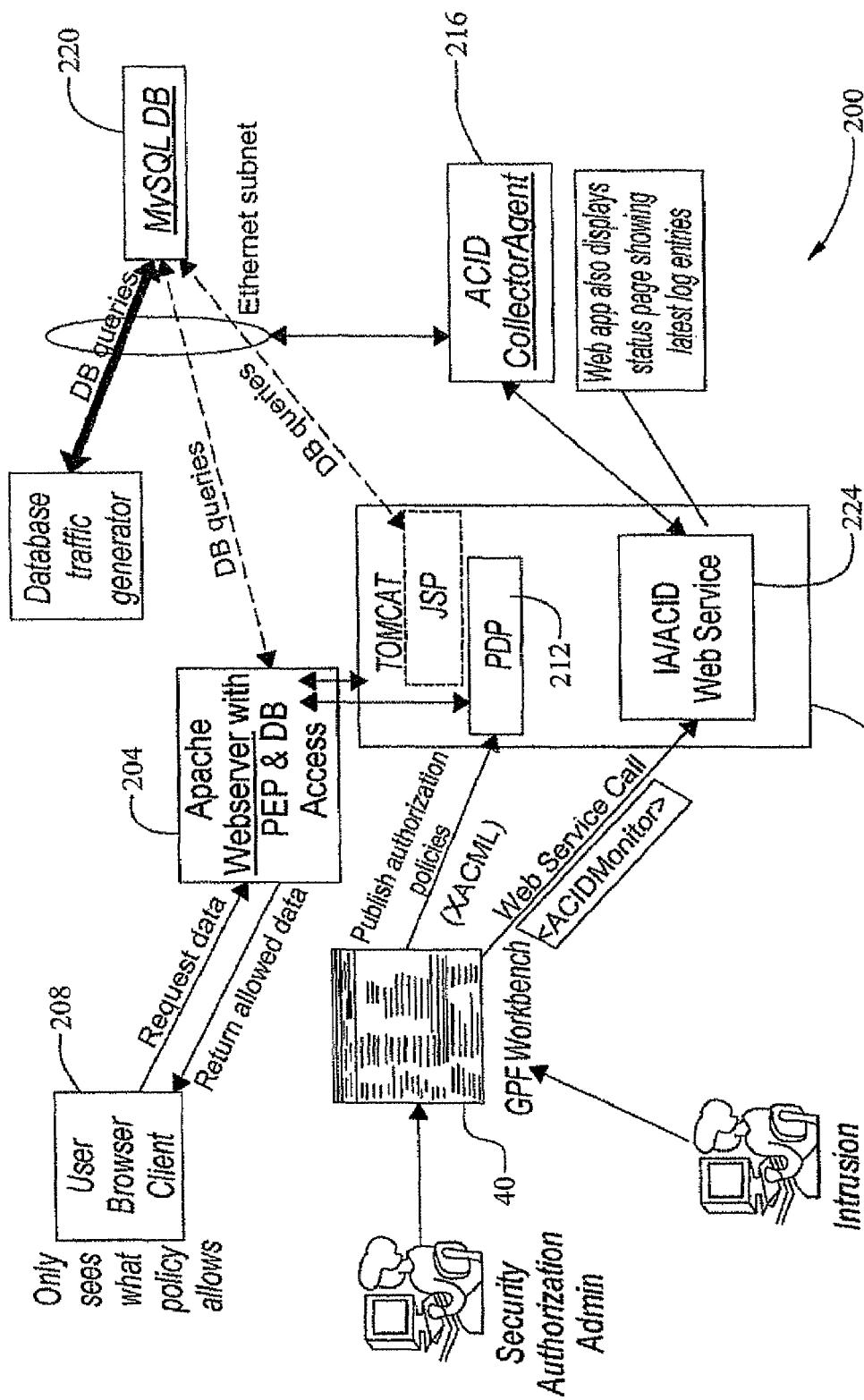
FIG. 3 is a diagram of an environment in which both authorization and intrusion detection policies are implemented in accordance with one implementation of the disclosure.

A diagram of an exemplary environment in which both authorization and intrusion detection policies are implemented is indicated generally in FIG. 3 by reference number 200. A PEP (Policy Enforcement Point)-enabled Apache web server 204 receives requests from a user browser client 208 and queries a PDP (Policy Decision Point) 212 included in a target system 52. An ACID-JADE (Analysis Console for Intrusion Databases-Java Agent Development Framework) Agent 216 monitors queries to a database 220 and sends monitoring information to an information assurance (IA)/ACID web service 224 that logs and displays the monitoring information.

Policy administrators using the workbench 40 capture requirements for authorization and intrusion detection. The administrators develop policy components such as attributes and actions that define the authorization and intrusion detection domains. The administrators then formulate policies and/or rules that regulate those two domains and publish or provision authorization and intrusion detection systems with those policies and rules. In FIG. 3, authorization components include the PEP 204 and the PDP 212. Authorization policies are published, e.g., in XACML to the PDP 212. Intrusion detection components include the ACID-JADE Agent 216 and the web service 224. The intrusion detection policies and/or rules are published to the ACID Web service 224, which accordingly informs the ACID-JADE Agent 216 as to what the Agent should monitor and what to do with the results of its monitoring, e.g., to email someone or to log entries in a specific log file.

Figure 4:
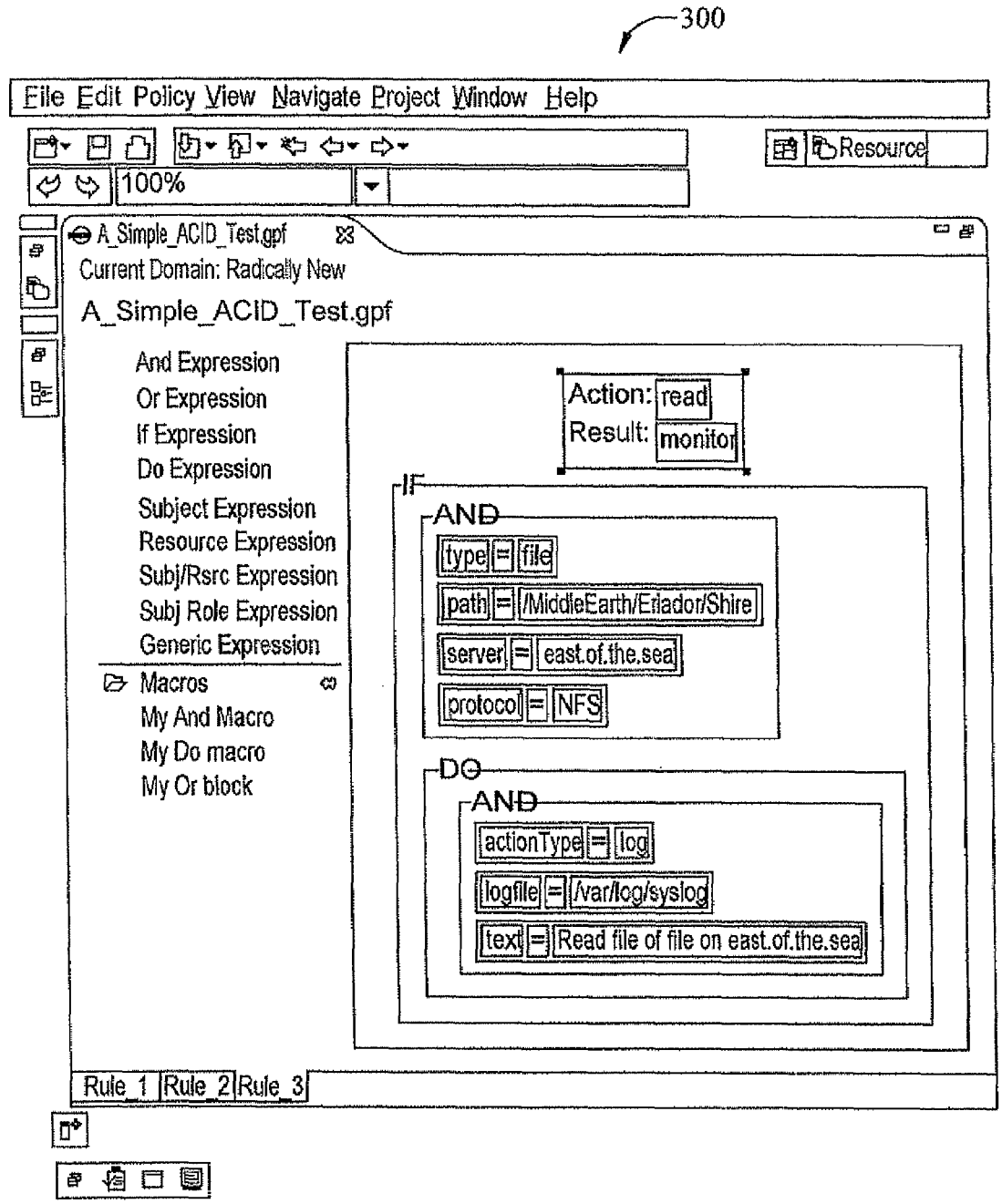
FIG. 4 illustrates a workbench screenshot of a rule associated with an intrusion detection domain in accordance with one implementation of the disclosure.

An exemplary workbench screenshot of a rule associated with intrusion detection is indicated generally in FIG. 4 by reference number 300. The rule 300 states that an intrusion detection system should monitor read access on a specific server (east.of.the.sea) for a specific protocol (NFS) for a specific path and then log these accesses into a specific log file (/var/log/syslog) with a certain descriptive text. Such rule(s) may be published from the workbench 40 to an underlying intrusion detection agent, e.g., the agent 216, in an XML format. A sample of such an XML formatted file follows.

```
<?xml version="1.0" encoding="ASCII"?>
<ACIDMonitor xmi:version="2.0" xmlns:xmi="http://www.omg.org/XMI">
  <FileMonitor path="/MiddleEarth/Eriador/Shire" protocol="NFS" server="east.of.the.sea">
    <LogAction logfile="/var/log/syslog" text="Read file of file on east.of.the.sea"/>
  </FileMonitor>
</ACIDMonitor>
```

In the foregoing example, each information assurance component has its own vocabulary. The workbench 40 can accommodate such variances as it allows a user to define naming conventions in a domain aggregation and permits customizing adapters 60 to provision the underlying enforcement systems.

Many components of a computing infrastructure can benefit from policy-based controls. Among these are workflow-based applications, quality of service (QoS) components, network components, etc. As in the case of information assurance components, it can be advantageous to use a policy-based approach for such other components, e.g., to achieve more consistent and dynamic capabilities. Thus, e.g., as an enterprise experiences changes in its goals, policies, and objectives, it can implement such changes in an orderly, controlled, and timely fashion without time consuming administration or programmatic changes.

Figure 5:
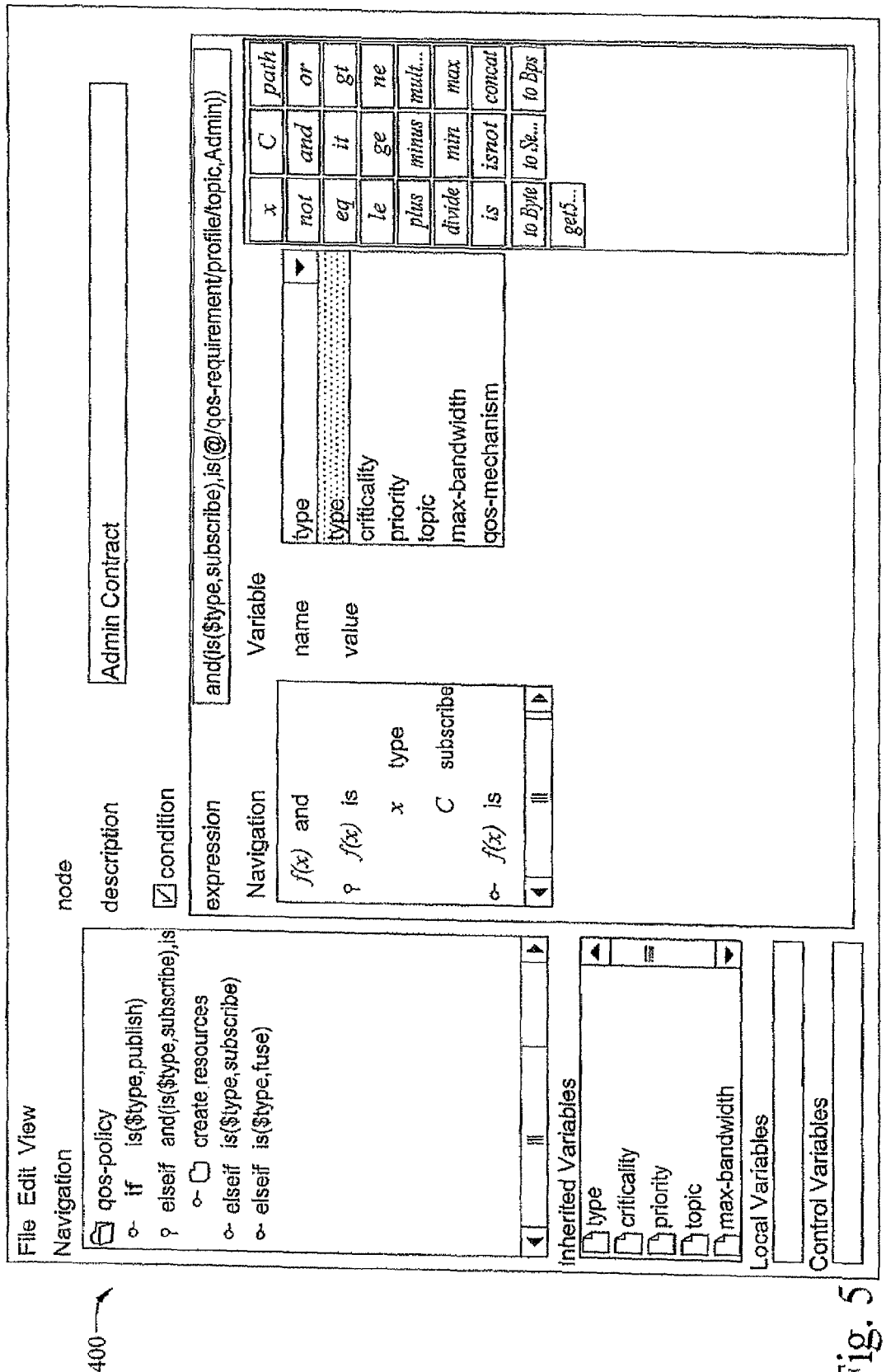
FIG. 5 illustrates a workbench screenshot of a policy/rule associated with a network Quality of Service (QoS) domain in accordance with one implementation of the disclosure.

An exemplary workbench screenshot of a policy/rule associated with a Quality of Service (QoS) domain is indicated generally in FIG. 5 by reference number 400. As shown in FIG. 5, attributes/variables associated with QoS are criticality, priority, max-bandwidth, etc. and the expressions are of the form "and", "if", "elseif", and "do".

Figure 6:
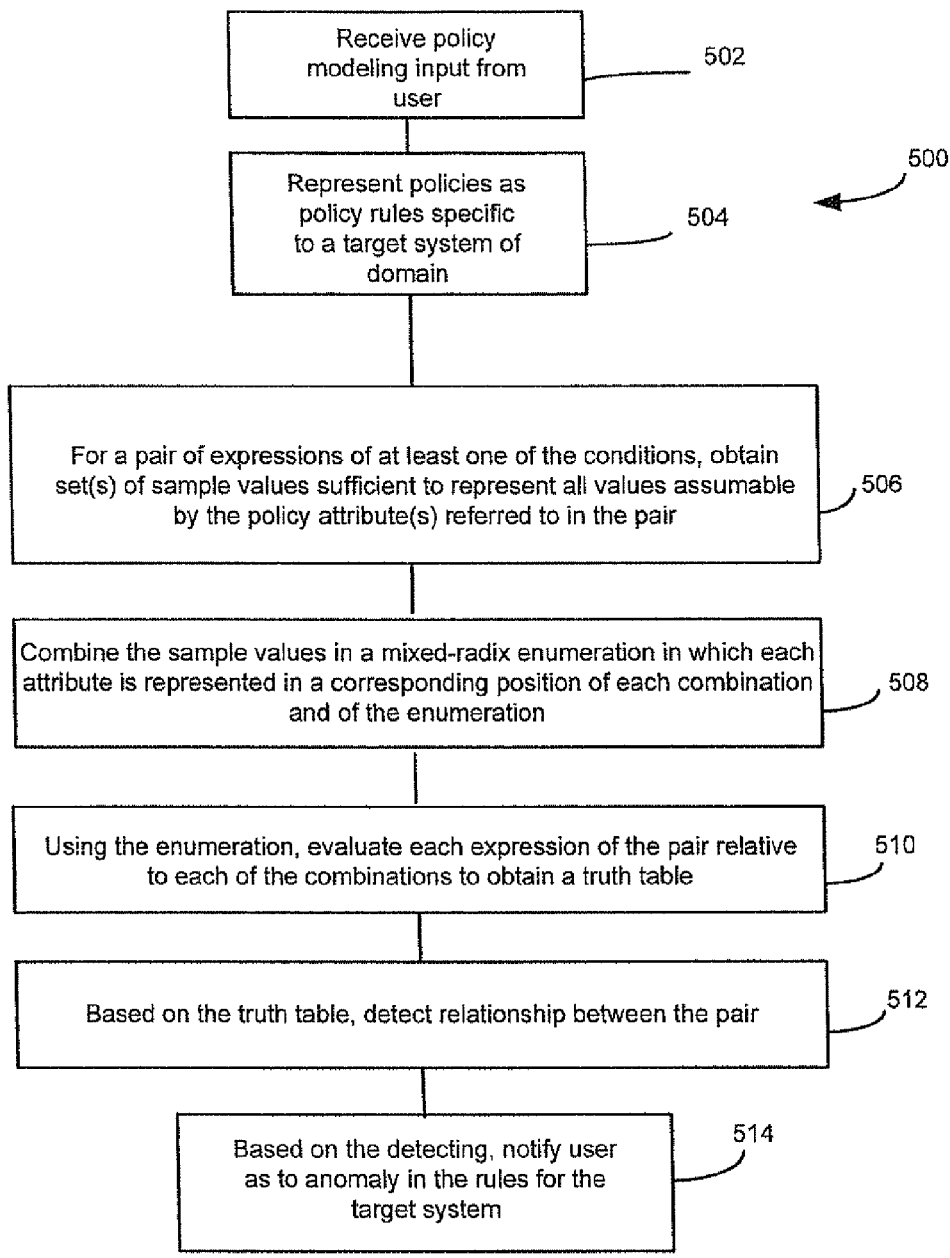
FIG. 6 is a flow diagram of a method of examining policies in accordance with one implementation of the disclosure.

Various systems and methods may be provided for analyzing policies for a domain, e.g., as previously described with reference to the Checker. One implementation of a method for examining policies for a domain is indicated generally in FIG. 6 by reference number 500. The method 500 is performed, for example, by one or more processors and memory of an enterprise computing system. In process 502, input is received from a user, e.g., who is using a graphical user interface of the apparatus 20 to model policies for one or more domains of the enterprise system. In process 504, the user input is used to represent policies as a plurality of policy rules specific to a target system of the domain, e.g., as described with reference to FIG. 2. Each policy rule includes a condition having one or more binary operator expressions, each expression referring to one or more policy attributes.

It should be noted generally that a rule's condition can be an arbitrarily deeply nested tree-structured Boolean expression involving conjunction(s), disjunction(s), negation(s), and/or binary attribute comparison(s). The term "expression" may be applied, e.g., to any sub-tree of a rule's condition, including an attribute comparison. Attributes may be compared with literal values and/or with other attributes. Attribute comparisons may involve tests for equality, set containment, and/or arithmetic relations. Attribute comparisons have true/false (i.e., Boolean) values. Accordingly, a rule's condition will evaluate to "true" or "false". In some implementations, and referring to FIG. 2A, the Conjunction class 154, Disjunction class 152, and Expression class 146 are all subclasses of the same Condition class. Thus the Checker may be used, for example, to transparently compare two rule conditions, two sub-trees under a single disjunction, and/or two attributes.

Referring again to the method 500 (shown in FIG. 6), in process 506, for a pair of expressions in at least one of the rule conditions, one or more sets of sample values are obtained, one set being obtained for each attribute. The sets are sufficient to represent all values assumable by the policy attribute(s) referred to in the pair. In process 508, the sample values assumable by attributes in the expression pair are combined in a mixed-radix enumeration in which each attribute is represented in a corresponding position of each combination and of the enumeration as further described below. In process 510, using the enumeration, the processor(s) evaluate each expression of the pair relative to each of the sample value combinations to obtain a truth table. In process 512, based on the truth table, a relationship between the pair of expressions is detected. In process 514, based on the detecting, the user is notified as to an anomaly in the rules for the target system.

An initial value of each attribute in a given comparison may be, e.g., the first value in its sample value set (i.e., the set of values that an attribute may assume). In various implementations, rules are repeatedly evaluated relative to a current combination of attribute values that is subsequently "incremented". For example, when a current combination is "incremented", a first attribute's value in the current combination is replaced with the next value in the sample value set for that attribute. If this operation "increments" the first attribute beyond its last sample set value, the first attribute is reset to its first sample set value and the next attribute in the combination is incremented to obtain a subsequent combination. This procedure is similar to adding 1 to a multi-digit decimal number, with a carry into a digit to the left when a current digit would be incremented up from "9".

In various implementations of the disclosure, a multi-radix value corresponding to an attribute combination may be composed of so-called "digits" that can each have a different number of values, which may include numeric and/or string values. Sample attribute value sets could be, e.g., {0, 1, 2, 3} or {USA, UK, France, Germany, Italy}, or {false, true}. "Incrementing" a sample attribute value combination [false, 2, Italy] results in a carry into a value to the right, yielding [false, 3, USA] as the subsequent value set combination. The multi-radix representation of policy attributes makes it possible to generate all combinations of sample attribute values for comparison of each pair of rules. In such manner, each potential agreement or disagreement between two logical expressions can be examined.

The method 500 may be executed as a software application and process, e.g., in a service-oriented architecture (SOA). The method 500 may be used to analyze computing policies of any type (e.g., information assurance policies, network management policies and/or quality management services polices) for policy inconsistencies and errors. In the method 500 policies modeled within a policy framework environment, e.g., as previously described, may be analyzed to identify policies that are not well-formed, contain logical errors (e.g., are contradictory), and/or that are inconsistent (e.g., redundant or specializations of one another). It should be noted generally that components of a rule condition are not limited to expressions but may also include disjunctions and/or conjunctions of expression components, which may themselves include disjunctions and/or conjunctions of expression components, and so on, recursively. Further, an expression may refer to more than one attribute. Such an expression may compare a subject attribute with a resource attribute, for example, as follows: "EmployeeCountry equals ProjectCountry".

Figure 7:
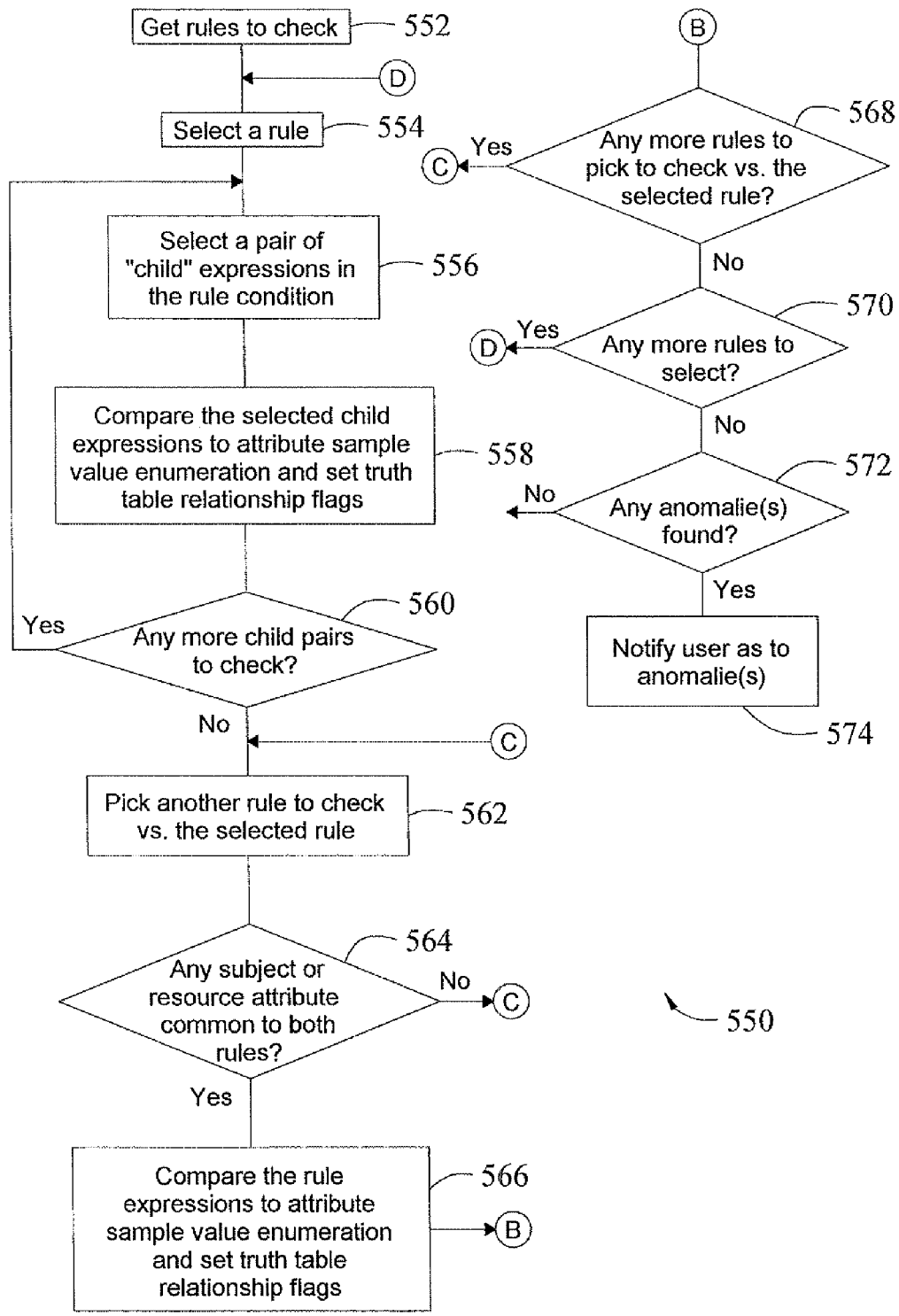
FIG. 7 is a flow diagram of a method of examining policies in accordance with one implementation of the disclosure.

In various implementations, policy rule conditions having nested "AND" and/or "OR" expressions (also referred to as "child" expressions) may be checked. Such conditions may optionally be normalized, e.g., put into disjunctive normal form, prior to checking. In one implementation, policy rules are checked in accordance with a processor-performed method indicated generally in FIG. 7 by reference number 550. In process 552 the processor obtains a plurality of rules to be checked. In process 554 one of the rules is selected. In process 556 the processor selects a pair of "child" expressions in the condition of the selected rule. In process 558 the processor compares the selected child expressions to an attribute sample value enumeration and sets one or more flags indicating one or more truth table relationships between the selected child expressions. If in process 560 it determined that there are more child pairs in the rule condition to check, then control returns to process 556. Otherwise in process 562 another rule is selected to be checked against the previously selected rule.

In process 564 it is determined whether there are any subject attributes and/or resource attributes common to both of the selected rule pair. If so, then in process 566 the expressions of the rules are compared to an appropriate attribute sample value enumeration and truth table relationship flags are set. Otherwise a new rule is picked in process 562. If in process 568 it is determined that there are more rules to be checked pairwise against the rule selected in process 554, then control returns to process 562 for the selection of another rule for rule pair comparison. Otherwise, if in process 570 it is determined that there are more rules to be selected for child pair comparison, control is returned to process 554. When all of the rules have been checked, in process 572 it is determined whether and if so, which, anomalie(s) have been found in the rules. If anomalie(s) have been found, then in process 574 the user is notified as to the anomalie(s).

Figure 8:
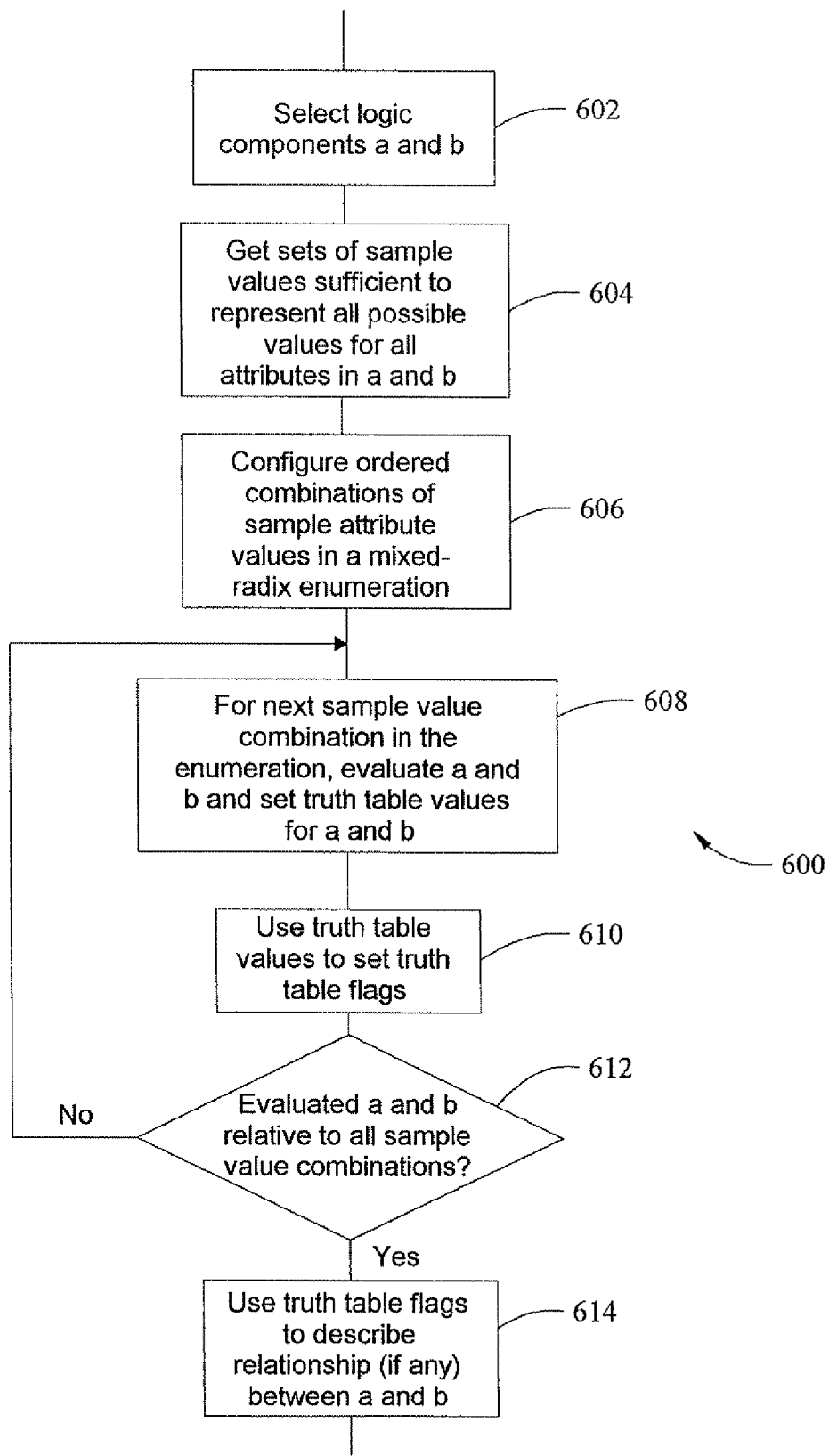
FIG. 8 is a flow diagram of a method of comparing policy rules and/or expressions in accordance with one implementation of the disclosure.

In various implementations, rule and expression comparison may be performed by a method indicated generally in FIG. 8 by reference number 600. In process 602 a pair of logic components a and b are selected and, e.g., made available in a Java ArrayList. The components a and b may be rule conditions and/or expressions, including ANDs and/or ORs. In process 604, sets of sample attribute values are configured that are sufficient to represent substantially all possible values for all attributes in the logic components a and b in the comparison to be made. In process 606 the sample values are configured in ordered combinations in a mixed-radix enumeration as further described below.

The pair of logic components a and b are compared with the sample combinations as follows. In process 608, for one of the sample combinations, the pair of logic components a and b are evaluated relative to the combination values and truth table values are set in accordance with the evaluations. The truth table values are used in process 610 to set one or more truth table flags as further described below. In process 612 it is determined whether all of the sample value combinations have been used to evaluate the logic components a and b. If there are more combinations to be used, then control returns to process 608 to obtain the next sample value combination in the mixed-radix enumeration and to use the next combination to evaluate a and b. When all of the sample value combinations have been used, then in process 614 the truth table flags are used to describe the relationship (if any) between the logic components a and b.

Figure 9:
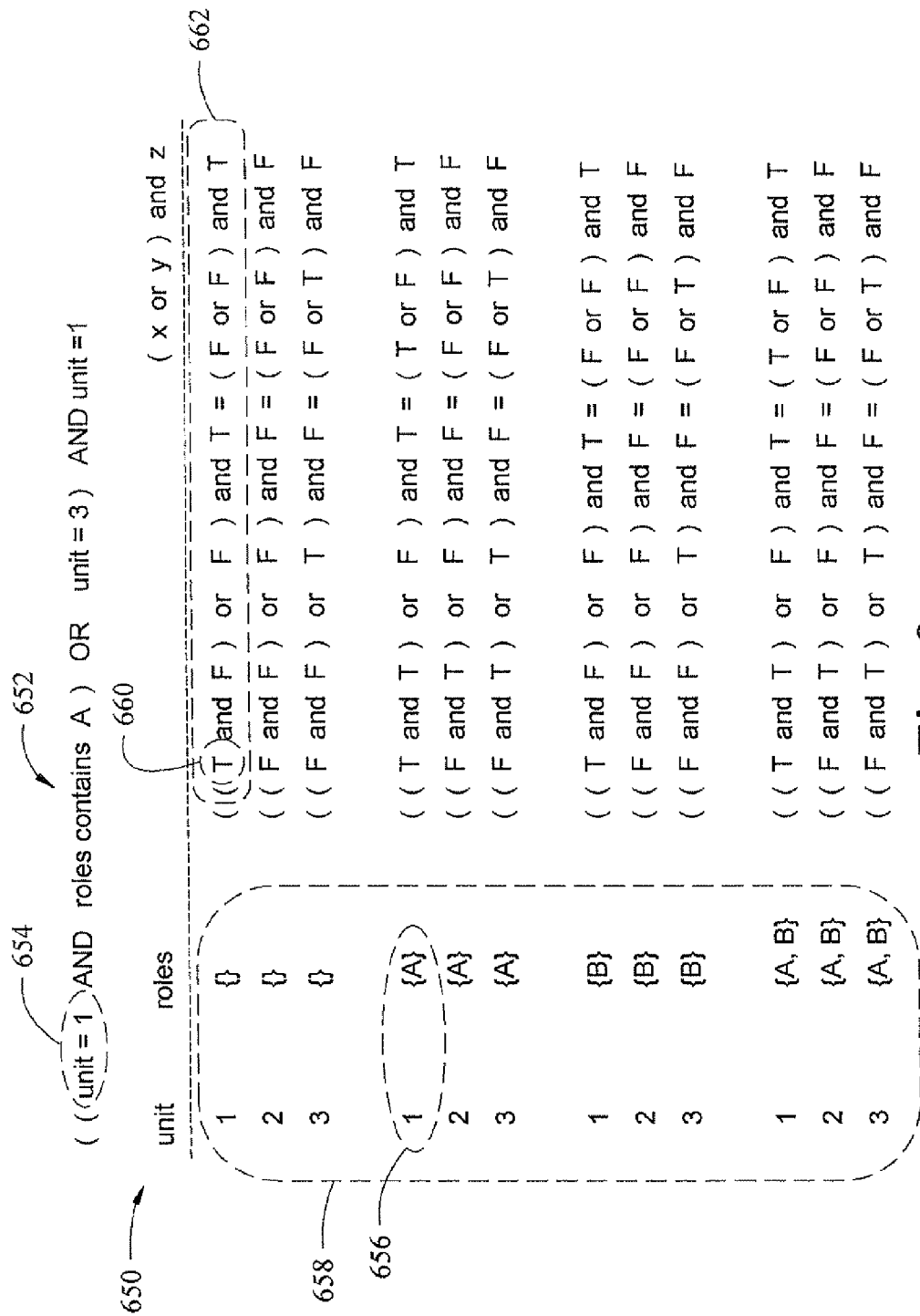
FIG. 9 is a diagram of a mixed-radix enumeration and truth table generated in accordance with one implementation of the disclosure.

In one implementation, a truth table may be obtained, e.g., as indicated generally in FIG. 9 by reference number 650. An example rule condition 652 states that "((unit=1 AND roles contains A) OR unit=3) AND unit=1". The rule condition 652 thus includes four operator expressions 654: "unit=1", "roles contains A", "unit=3", and "unit=1". The rule condition 652 refers to two attributes, i.e., "unit" and "roles". The attribute "roles" may assume one of four sample values: an empty set { } and sets {A}, {B}, or {A, B}. The attribute "unit" may assume one of three sample values: 1, 2 or 3. Accordingly, twelve ordered combinations 656 of sample attribute values are provided against which to evaluate the condition 652. The combinations 656 are configured in a mixed-radix enumeration 658. Each attribute is represented in a corresponding position in each of the combinations 656 and in the enumeration 658.

The condition 652 is evaluated as to each of the twelve ordered combinations 656. As each of the expressions in the condition 652 is evaluated, one or more truth table values 660 are generated. In the present example, the first sample "unit/ roles" value combination 656 is "1 { }", which results in a line 662 of truth table values when used to evaluate the condition 652. It should be noted generally that truth tables and/or truth table values may be generated dynamically and are not necessarily retained in memory after being used in a given evaluation. For purposes of speed and efficiency, in various implementations a truth table may be generated that includes only those values sufficient to support a given evaluation. Accordingly it should be understood that the term "truth table" as used in the disclosure and in the claims may be used to refer to a set of values that is dynamically generated and that does not necessarily include all possible truth table values.

In some implementations two types of policy analysis may performed. A "generic" (i.e., target-agnostic) analysis of policies may be performed to identify errors and inconsistencies common to any type of policy. Additionally or alternatively, a "target-specific" analysis may be performed that addresses policy-type- and target-specific errors and/or inconsistencies. In such manner, policy errors and/or policy inconsistencies may be identified, for new policy types and targets as well as for pre-existing ones. In various implementations, analysis methods and systems may be adapted to new policy types and problem domains substantially without programming, via modifications to an underlying model of a target system for which new policies are added.

Domain-specific policy constructs and constraints (such as Separation of Duties for the authorization/access control domain) can be explicitly represented so that (policy) type-specific analysis can be performed where appropriate. Analytical results may be cached and a "change-driven" incremental analysis strategy may be implemented, e.g., to analyze new and/or changed policies.

In various policy framework implementations, a linkage is maintained between business and system requirements and the policies intended to satisfy those requirements. Various implementations may make use of such a feature to automatically identify business and/or other requirements that are not satisfied by policies and/or to identify policies that do not have a clearly defined purpose or scope.

In various policy framework implementations, e.g., as described above with reference to FIG. 2, policies are represented as rules in which conditional expressions referring to attributes of subjects (e.g., a person or actor) and resources (e.g., a system, information, or thing) are related to actions. To support performance of an analysis, key information to be used in the analysis (such as the types of policies and actions a target system understands) is extracted from a target system model, e.g., from the model 100 shown in FIG. 2. A set of anomaly "signatures" may also be extracted that serve to identify each error or inconsistency of interest.

In various implementations, it may first be verified that each policy to be analyzed is well-formed in accordance with an applicable policy schema. The well-formedness check may verify that each rule of each policy selected for analysis is syntactically correct and that all subject attributes, resource attributes, actions, and/or result types referenced by the policy are correctly specified, and/or that common or type-specific constraints are not violated. Each well-formed policy violation may be tagged as an error. Such an error may be reported and an explanation of the error provided to a user for review and correction. Further analysis is typically suspended pending correction of any and all well-formedness policy errors.

After a set of policies passes a well-formedness check, a "walk" through a truth table may be performed, e.g., as previously described, to identify any rules or policies matching one or more detected anomaly signatures. A pair-wise comparison of rules may be performed to identify any rules satisfying the signature of a known anomaly. Such anomalies include, e.g., two rules that have identical or opposite effects, one rule that generalizes another, and/or a rule that violates a type-specific concept such as separation-of-duties. Specifically and for example, truth table relationship flags may be set based on truth table values obtained, e.g., as shown in FIG. 9. Truth table relationship flags may be set to indicate overlap (i.e., where two logic components are both true at least once), opposite logic components (i.e., the logic components always return opposite values), identical logic components (i.e., the logic components always return the same values), "implies" (i.e., whenever a first logic component is true, the second logic component is also true), and/or "implied by" (i.e., whenever the second logic component is true, the first logic component is also true). During a single "walk" through a truth table, generic anomalies and/or anomalies may be identified that are type- or target-specific. Each anomaly is typically tagged with an appropriate annotation (to indicate the type of anomaly) and the results are presented to the user for review and correction.

As previously discussed with reference to FIG. 9, expressions, conditions and rules may be analyzed based on a mixed-radix enumeration representation of ordered attribute combinations. In some implementations, substantially all possible combinations of the referenced subject and resource attributes may be checked in order to compare truth-tables for pairs of rules. In a given comparison of ordered sets of sample values, fewer than all possible combinations may be checked if a limited set of sample attribute values is determined to be sufficient for representing all possible agreements and/or disagreements between two logic components.

As previously mentioned, the Checker may alert an administrator to errors, inconsistencies, and/or anomalies in a current policy model by means of a listing of problem markers. Such markers may be displayed, e.g., in a "Problems" view provided via the modeling workbench 40. Each problem marker indicates the specific nature of a problem and its location in the policies being created. A mouseclick on such a marker may cause the workbench 40 to navigate to the policy element containing the problem. The Checker can be run continuously while policies are being created so that errors can be detected and corrected immediately.

Software in accordance with various implementations is written in standard Java, but could be implemented in any high-level programming language. In some implementations an open-source Eclipse environment is used for execution.

In various implementations, logical expressions may be compared over variables that may be real-valued, may be discrete and/or may have unspecified ranges of possible values. As previously discussed, two logical expressions may be compared to determine whether they are logically identical, exactly opposite, completely disjoint, or whether one is a generalization of the other.

The Checker examines policy rules for contradictions and other anomalies. As part of this analysis, the Checker determines whether two rules apply in the same situations. When they do, the Checker determines the relationship between the two rules, by comparing the truth-tables for pairs of logical expressions. For example, given the following rules:
"Rule_1: if (subject.level >2) then allow.read.document"
"Rule_2: if (subject.licenses contains E123 AND subject.company=Boeing AND subject.level >4) then allow.read.document",
it can be determined that Rule_1 is a generalization of Rule_2, because the logical condition of Rule_1 is satisfied whenever the condition for Rule_2 is satisfied, as well as in additional cases. Furthermore, this determination can be made without needing to specify possible values of the variables "subject.level", "subject.licenses", or "subject.company" beforehand.

In various implementations, logical expressions for rules are compared over variables whose legal values may initially be unknown (such as the foregoing "subject.licenses"), or may involve numerical comparisons (such as "subject.level"). For example, where it is not known what values the attribute "subject.licenses" might assume, it nevertheless is known that "subject.licenses" include a string value. Accordingly, proxy string values may be generated dynamically as place holders for comparison. It should be noted generally that a sample value set can be abbreviated dependent on what comparisons are to be made, as long as enough values are included to generate all possible logical outcomes. For example, where it is to be determined whether a given attribute "equals" or "does not equal" a specified value, the specified value typically would be included as the first sample value in the value set for that attribute, thereby providing a sample value that would generate the "equals" outcome. Only one additional sample value, i.e., a proxy value not equal to the first sample value, would need to be included in the set, to generate the "does not equal" outcome.

Some string values, e.g., dates, may be mapped to integers for numeric comparisons. For some numeric comparisons, the real number line may be divided into partitions, and numbers mentioned in an expression may be used as partition boundaries. For example, where a determination is whether "x is less than 5", a sample value set of {4, 5, 6} would be sufficient to generate all logical outcomes. As another example, in order to determine whether "x is greater than 10", whether "y is greater than 15", and/or whether "x is greater than y", the real number line may be divided into three ranges at 10 and at 15. In each range would be included two proxy values, i.e., one proxy value each for x and for y. Thus a sample value set for both x and y could be, e.g., {2, 3, 11, 12, 19, 30}. In various implementations, a number of values to be represented in a value space may be determined (in the previous example, there are two values: x and y), and appropriate ranges may be selected (in the previous example, there are three ranges). From each range, a proxy value may be selected for each value and included in a sample value set.

Comparing logical expressions in accordance with various implementations of the disclosure allows comparison of complex logical expressions (such as policy rule conditions) that: (a) contain variables that range over large sets of values, (b) contain a mixture of discrete and real-valued variables, and/or (c) can be compared for contradictions when some variables have unknown values and/or unknown ranges.

As previously discussed, a mixed radix enumeration (also referred to as a variable-based number scheme) is used to efficiently organize policy conditions for the inconsistency and error analysis, and to enable a scenario-driven "what-if" analysis. Translation of configurations of attribute variables into multi-radix representations can provide an effective mechanism for looping through sample attribute configurations. By choosing sample values from actual values used in a policy (typically a small set) and at times by including a set of interpolated values, a number of sample configurations needed to generate all possible agreements or disagreements between two expressions can be minimized.

A set of sample attribute values may be determined for each attribute sufficient for discovering all possible truth values and interactions between given logical components. Some attributes may have pre-defined value sets. Attributes that do not have predefined value sets may be grouped together into classes of attributes that are compared with one other. For each of these classes a set of sample values may be constructed that are compared with one of the variables in the class, plus a set of values between those values. It can be shown that cycling through the permutations of such variable settings will suffice to generate each possible agreement or disagreement of the logical components.

For each combination of sample attribute values, a set of five Boolean flags is updated to record a state of analysis:
    overlap: found at least one combination where both expressions return the value true
    opposite: true if there were no combinations where the expressions returned the same logical value
    identical: true if the expressions never returned different results in the analysis implies: false if we found at least one combination where the first expression returned true and the second expression returned false implied-by: false if we found at least one combination where the first expression returned false and the second expression returned true Upon completion, these flags indicate whether two expressions are identical, exactly opposite, whether one is a generalization of the other, or whether they never apply to the same configuration.

The foregoing methods and systems may be used to produce logical comparisons of binary operator expressions over variables that may have undefined ranges of possible values. The invention generates all possible truth-table agreements or disagreements between a pair of expressions. It does this by counting through a multi-radix number representation of a small but sufficient set of sample values chosen for each attribute.

Implementations of the foregoing methods and systems make it possible to create a consistent and error-free set of policies for a computing system, or system-of-systems, and to ensure that all of the policy requirements are satisfied. Existing tools typically do not ensure the consistency and error-free status of a set of heterogeneous policies (i.e., policies of different types, such as both authorization and intrusion detection policies). Existing tools typically do not maintain the relationships between the requirements that define the purpose of a set of policies and the policies which attempt to satisfy those requirements. Manual analytic methods are typically skill- and labor-intensive and error-prone.

In various implementations, the foregoing methods and systems are readily adaptable to new policy types and analytical situations, more comprehensive analysis of policies. Heterogeneous policy sets (e.g., policy sets composed of policies of more than one type) can be analyzed and validated. The foregoing systems and methods can be useful to businesses and/or governmental organizations for identifying anomalies and/or errors in the policies that govern their computing systems. Consistent and error-free sets of business, regulatory, and administrative policies can be authored that can be readily implemented to support business processes. Costs associated with administering computing systems can be significantly reduced.

In various implementations of the disclosure, variables may potentially have any of a large number of possible values. For example, "Country" could be an element of {USA, France, UK, Germany, Italy, Spain, China, Australia, Canada, ... }, StartTime could be a time of day represented as a (large) integer number of milliseconds since Jan. 1, 1970, and X could be an arbitrary real number. The foregoing methods and systems offer significant improvements over basic SAT solvers, which expect variables to be Boolean and thus to have only two possible values.

Constraint satisfaction methods generally require that all variables take values from small, discrete value sets, which have been specified and indexed in advance. In contrast, the foregoing methods and systems are not so restricted. Logical expressions may have discrete-valued variables with large value sets, as well as real-valued variables (which have an infinite, or at least a very large, number of possible values). In addition, the foregoing methods and systems allow some variables to have unknown values and make it possible to solve for values that make expressions match.

The foregoing method of comparing logical expressions allows the use of variables that range over large sets of values, allows a mixture of discrete and real-valued variables, allows comparison of expressions for contradictions when some variables have unknown values and unknown ranges, and is easier to implement than a full-blown system for constraint logic programming. As described above, the foregoing methods and systems make it possible to compare logical expressions that could not be efficiently compared using existing methods.

The broad context of policies and the modeling tool provided in various implementations of the disclosure can enable business units and programs to capture security requirements and develop policies in a consistent manner that promotes better integration and control of security controls than is available through existing methods. In most current systems, each type of policy typically is specified in a separate protocol and is authored and maintained within a protocol-specific application, even where the aggregate set of policies is subject to the same enterprise requirements. As a result, many administrative tools must be used to administer the applications and networks used by an enterprise. In contrast, the integration of security requirements in accordance with various implementations of the disclosure can promote "defense in depth" requirements for enterprises and governmental entities as security components are able to enforce a more cohesive and consistent set of policies than previously possible.

The foregoing framework provides an application- and protocol-agnostic environment in which a set of policies can be authored and verified prior to being adapted to the application-specific protocols needed by existing enterprise administrative tools and systems. It also permits capture and linking of requirements to policies. The framework leverages a unique internal representation of policies, policy requirements, and target environments that facilitates policy inspection, policy analysis, and the automatic, correct adaptation of policies to application-specific protocols. The framework can be readily adapted to support new application-specific protocols via an extensible target environment modeling capability.

The foregoing framework provides a means to analyze and validate a set of policies prior to adapting the policies to multiple target applications, and to adapt this set of policies to multiple, diverse target systems. Policy definition is at a higher, more abstract level than existing systems, which rely on mappings between individuals and individual resources. Therefore there are fewer policies to control and administer. The foregoing framework also captures policies relevant, e.g. to a plurality of information assurance components and/or sub-systems such as authorization, intrusion detection, secure workflow, etc. It supports detailed policy examination, including consistency checking and "what if" analyses of the policies. The framework is less expensive than existing systems to administer and permits faster and more consistent and accurate changes to requirements.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method of examining policies for a domain of an enterprise system, the method comprising:

in response to user input, representing the policies as a plurality of policy rules for use in a target system of the domain, each of the policy rules including a condition in which one or more expressions are included, each expression referring to one or more policy attributes;

for a pair of expressions included in at least one of the conditions:
obtaining one or more sets of sample values sufficient to represent all values assumable by the one or more policy attributes referred to in the pair of expressions;
combining the sample values in a mixed-radix enumeration in which each attribute is represented in a corresponding position of each sample value combination and of the mixed-radix enumeration; and
using the mixed-radix enumeration, evaluating each expression of the pair of expressions relative to each of the sample value combinations to obtain a truth table;
based on the truth table, detecting a relationship between the pair of expressions; and based on the detecting, notifying the user as to an anomaly in the rules for the target system;
the method performed by one or more computers of the enterprise system.

2. The method of claim 1, the evaluating comprising determining truth and/or falsity values for two or more of the expressions as logically combined in one of the policy rules.

3. The method of claim 1, further comprising normalizing the binary operator expressions of a policy rule.

4. The method of claim 1, further comprising:
for each expression in a pair of the policy rules, determining truth and/or falsity values of the expressions relative to each of the combinations of the sample values; and
using the truth and/or falsity values for the pair to analyze aspects of the pair of rules.

5. The method of claim 1, performed as to a different policy type and/or domain, based on a modification, received from the user, of a model of the target system.

6. The method of claim 1, performed using a service-oriented architecture.

7. The method of claim 1, wherein at least one of the sets of sample values includes non-numeric values.

8. The method of claim 1, wherein at least one of the policy rules includes a separation-of-duties constraint.

9. A system for examining policies for a domain of an enterprise system, the system comprising one or more processors and memory of the enterprise system configured to:
in response to user input, represent the policies as a plurality of policy rules specific to a target system of the domain, each of the policy rules including a condition in which one or more binary operator expressions are included, each binary operator expression referring to one or more policy attributes;
check one or more of the policy rules; and
based on a result of the checking, notify the user as to an anomaly in the rules for the target system;
the one or more processors and memory further configured to:
for each policy attribute in the one or more policy rules being checked, configure a set of sample values assumable by the policy attribute and sufficient to represent substantially all possible agreements and/or disagreements between two binary operator expressions being compared that refer to the policy attribute;
for a policy rule being checked, compare each binary operator expression in the rule with each combination of the sample values for the attributes referred to by the binary operator expressions, in an order determined by a mixed-radix enumeration of the sample values; and
based on a result of the comparing, detect a relationship between truth tables for the one or more rules being checked.

10. The system of claim 9, wherein the one or more processors and memory are configured to interpolate one or more additional values between values of the set for one of the attributes.

11. The system of claim 9, wherein the one or more processors and memory are configured to configure the sets of attribute sample values as ordered combinations to obtain the mixed-radix enumeration.

12. The system of claim 9, wherein the one or more processors and memory are configured to:
in response to user input, modify a target system model; and
using the modified target system model, check one or more policy rules as to a different policy type and/or domain.

13. The system of claim 9, wherein the one or more processors and memory are configured to check the one or more of the policy rules using a service-oriented architecture.

14. The system of claim 9, wherein at least one of the policy rules includes a separation-of-duties constraint.

15. The system of claim 9, the one or more processors and memory configured to provide logical comparisons of binary operator expressions over variables at least one of which has an undefined range of possible values.

16. A system for examining policies for a domain of an enterprise system, the system comprising one or more processors and memory of the enterprise system configured to:
in response to user input, represent the policies as a plurality of policy rules specific to a target system of the domain, each of the policy rules including a condition in which one or more binary operator expressions are included, each binary operator expression referring to one or more policy attributes;
check the conditions of each pair of the policy rules relative to one or more sets of sample values assumable by the one or more policy attributes referred to in the binary operator expressions of the conditions of the pair; and
based on a result of the checking, notifying the user as to an anomaly in the rules for the target system;
the one or more processors and memory configured to, for each pair of binary operator expressions of the conditions being checked:
configure each combination of the sample values for attributes referred to in the pair of binary operator expressions in a mixed-radix enumeration in which each attribute is represented in a corresponding position of the mixed-radix enumeration;
using the mixed-radix enumeration, evaluate each expression of the pair of binary operator expressions relative to each of the combinations and compare the expression evaluations to one another; and
based on a result of the comparing, detect a relationship between truth tables for the pair of rules being checked.

17. The system of claim 16, the one or more processors and memory configured to provide logical comparisons of binary operator expressions over variables at least one of which has an undefined range of possible values.

18. The system of claim 16, wherein the one or more processors and memory are configured to interpolate one or more additional values between values of the set for one of the attributes.

19. The system of claim 16, wherein the one or more processors and memory are configured to configure the sets of attribute sample values as ordered combinations to obtain the mixed-radix enumeration.

20. The system of claim 16, wherein the one or more processors and memory are configured to normalize the binary operator expressions of a policy rule.

* * * * *